J. B. BUSHNELL.
DUMPING RACK.
APPLICATION FILED MAR. 11, 1909.
994,718.
Patented June 13, 1911.
4 SHEETS—SHEET 4.
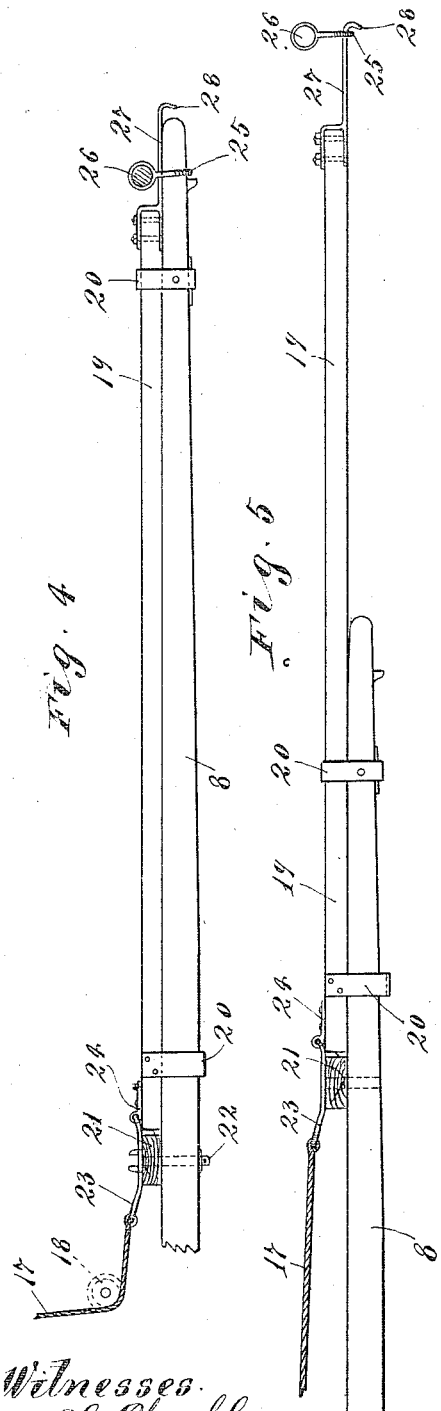
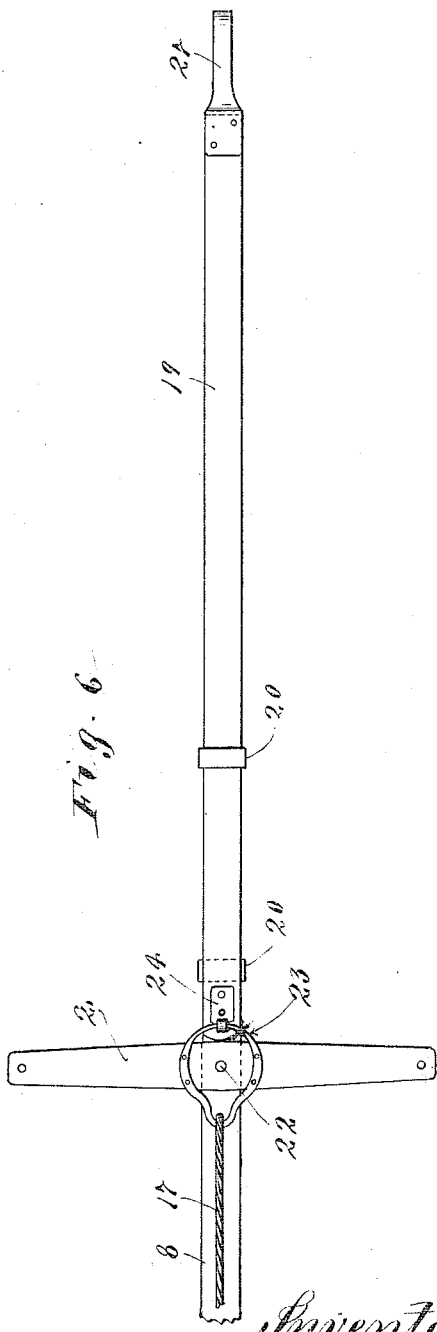
Witnesses
A. H. Opsahl.
R. P. Hicks.
Inventor
J. B. Bushnell
By his Attorneys
Williamson Merchant

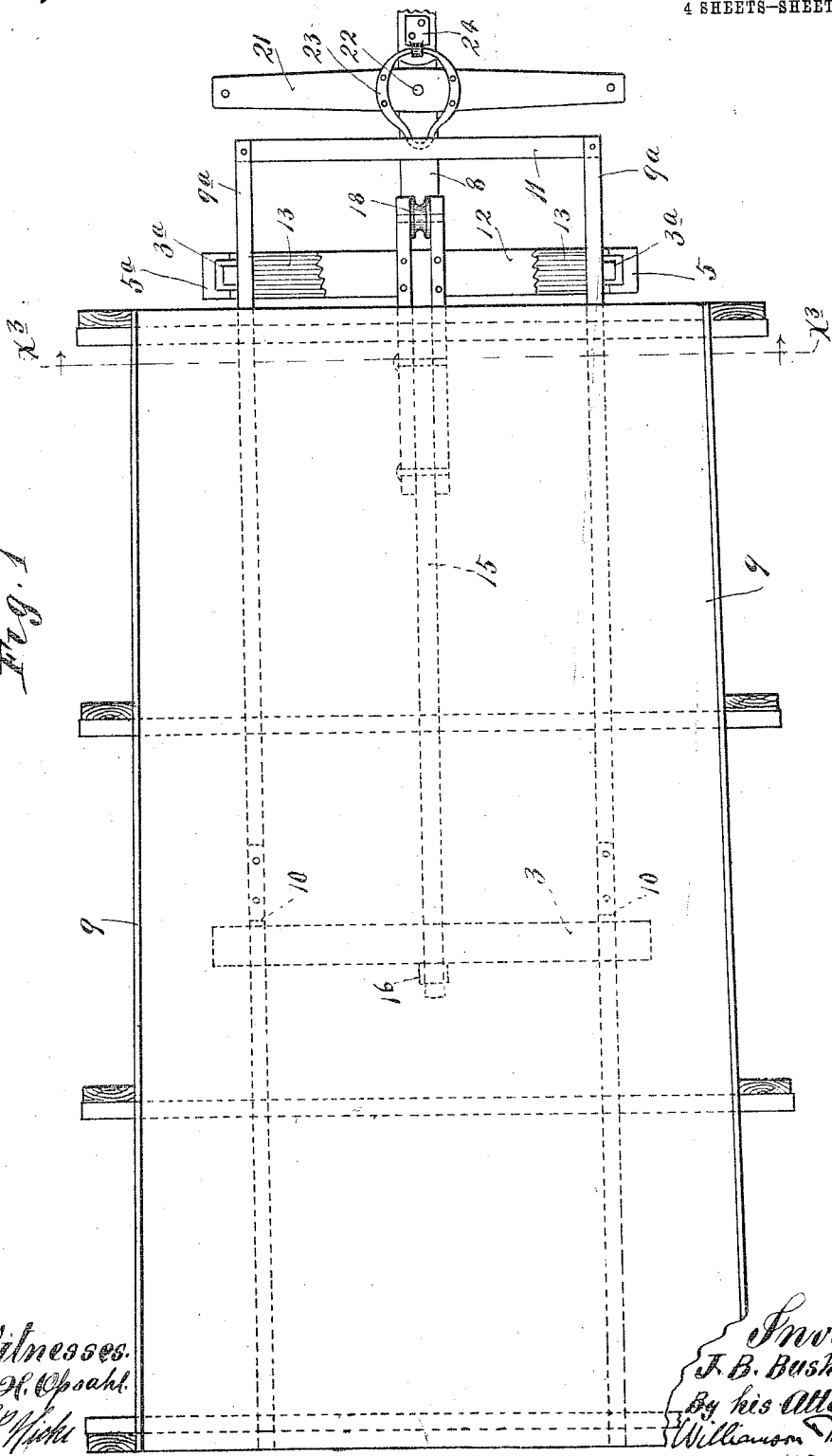

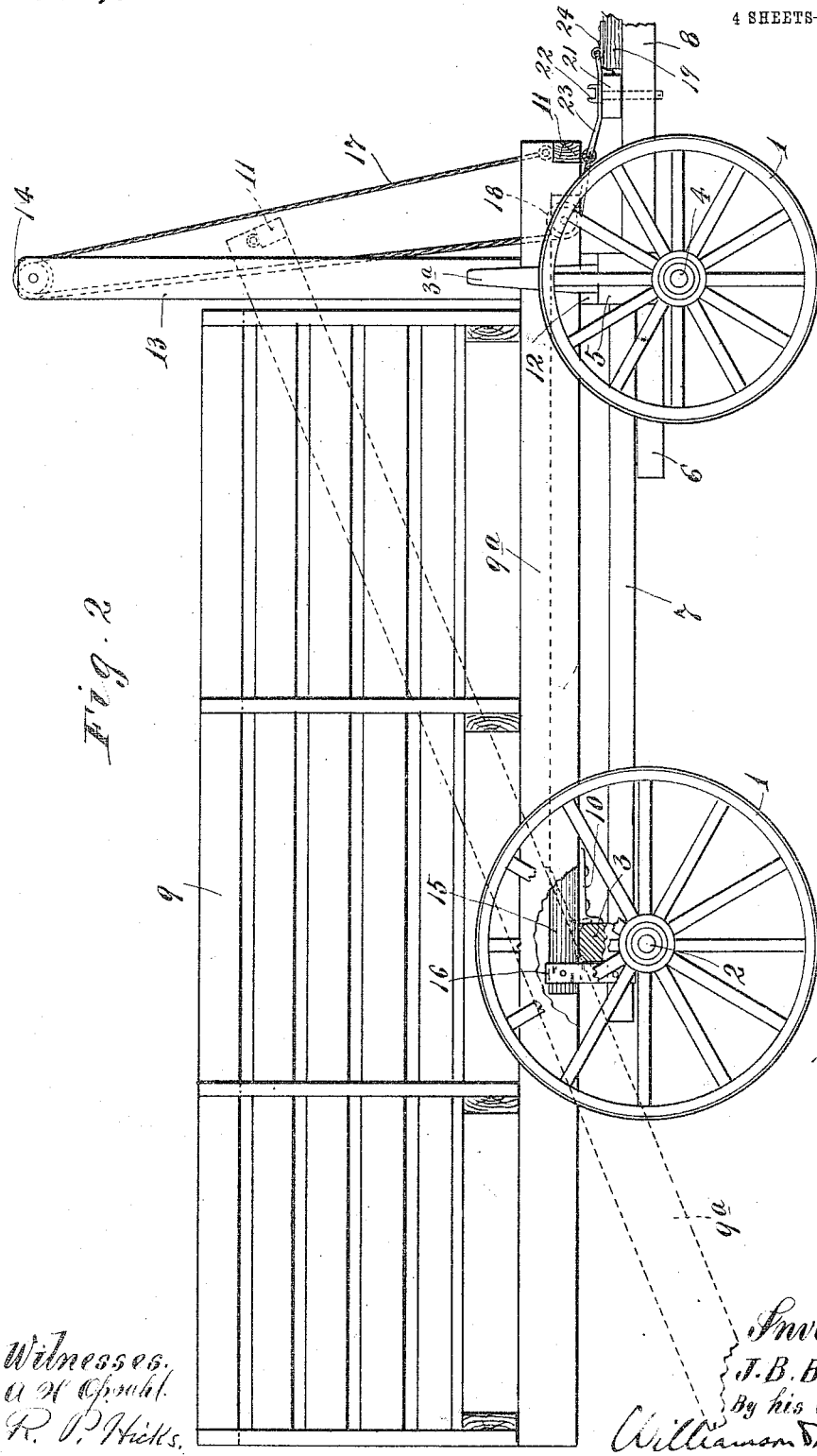

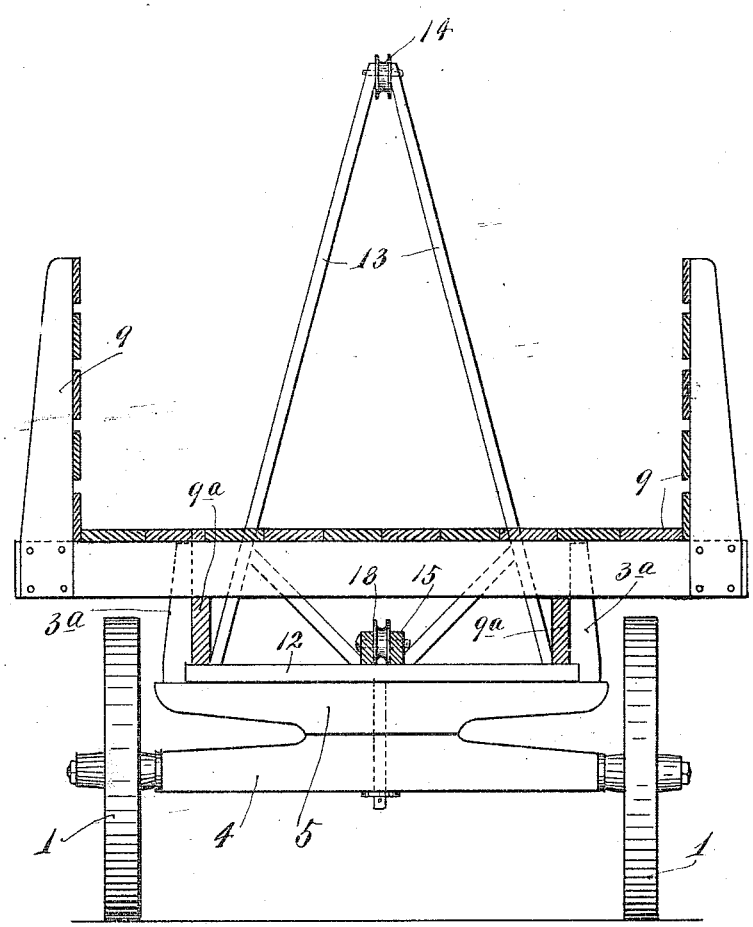

UNITED STATES PATENT OFFICE.

JOHN B. BUSHNELL, OF MINNEAPOLIS, MINNESOTA.

DUMPING-RACK.

994,718. Specification of Letters Patent. Patented June 13, 1911.

Application filed March 11, 1909. Serial No. 482,735.

*To all whom it may concern:*

Be it known that I, JOHN B. BUSHNELL, a citizen of the United States, residing at Minneapolis, in the county of Hennepin and State of Minnesota, have invented certain new and useful Improvements in Dumping-Racks; and I do hereby declare the following to be a full, clear, and exact description of the invention, such as will enable others skilled in the art to which it appertains to make and use the same.

My invention has for its object to provide an improved dumping rack, and to this end, it consists of the novel devices and combinations of devices hereinafter described and defined in the claims.

Especially this invention has for its object to provide a simple, efficient and easily operated dumping rack for handling loose grain and hay; but it is capable of use generally as a dumping rack, the term "rack" being herein used in a broad sense to include any kind of a vehicle body or receptacle.

In the accompanying drawings, which illustrate the invention, like characters indicate like parts throughout the several views.

Referring to the drawings, Figure 1 is a plan view with some parts broken away, showing the improved rack and coöperating devices applied to an ordinary wagon running gear; Fig. 2 is a side elevation of the parts shown in Fig. 1, some parts being broken away; Fig. 3 is a section on the line $x^3$ $x^3$ of Fig. 1; Fig. 4 is a side elevation of the pole structure, showing the same in normal position; Fig. 5 is a view corresponding to Fig. 4, but showing the supplemental section of the pole drawn forward; and Fig. 6 is a plan view of the parts shown in Fig. 5.

Of the parts of the running gear, the numeral 1 indicates the wheels, the numeral 2 the rear axle, the numeral 3 the rear bolster, the numeral 4 the front axle, the numeral 5 the front bolster, the numeral 6 the front hound, the numeral 7 the reach and the numeral 8 the pole.

The dumping rack 9 is intermediately mounted for dumping movements directly on the rear bolster 3, and the longitudinally extended bottom beams 9ª thereof are shown as provided with stop brackets 10 that engage the front face of the said rear bolster 3 and prevent the rack from sliding rearward when it is moved into its dumping position, indicated by dotted lines in Fig. 2. The front ends of the beams 9ª project in front of the front bolster 5 and, as shown, are tied together by a cross bar 11, while the body portion of the said rack terminates at its front end slightly at the rear of the front bolster. The front portions of the rack beams 9ª normally rest directly upon the transverse base beam 12 of an upright derrick frame 13, which, as shown, is made up of a pair of upwardly converging bars provided at their connected upper ends with a guide sheave 14. The said base beam 12 rests directly upon the front bolster 5 and at its ends is detachably held by the upwardly extended end posts 3ª of the latter.

To steady the upright derrick frame 13, a reach bar 15 is rigidly secured at its front end to the base bar 12 thereof and is extended rearward and rested upon the central portion of the rear bolster 3. To prevent raising of the rear end of the said derrick reach 15, the rear end thereof is preferably detachably clamped to the rearwardly projecting end of the vehicle reach 7, by means of a suitable link or coupling bracket 16.

To cause the rack to more readily discharge its load, when tilted into a dumping position, the sides thereof are preferably made flaring in a direction from the front toward the rear end of the rack, as shown in Fig. 1. That portion of the rack which is forward of its fulcrum, to-wit, of the rear bolster 3, is heavier than that portion which is to the rear thereof, and, hence, the said rack will, of course, normally maintain its operative horizontal position whether loaded or empty, and after the load has been dumped, it will by gravity be automatically returned to its normal position.

To raise the front end of the rack, and thereby tilt the said rack into its dumping position, a cable 17 is passed over the sheave 14 and one end thereof is attached preferably to the central portion of the transverse front bar 11 of said rack while the other end of the said cable is passed under a guide sheave 18 mounted in suitable bearings on the forwardly projecting end of the derrick reach 15. When the lower end of the cable 17 is drawn forward, it is evident that the forward end of the rack will be raised and the said rack will be forced into its dumping position. This forward movement of the said cable may be produced by various means, but preferably it is accomplished by a novel dumping device arranged to be operated by power afforded by the horses and the preferred form of which is best shown in Figs. 4, 5 and 6, but also, in part, in Figs. 1 and 2.

In applying this improved dumping device, the pole 8 may be of ordinary construction connected to the front axle of the running gear in the customary way. The said pole, however, is provided with a slidable supplemental section 19 preferably placed on top thereof and connected for sliding movements to said main pole 8 by a pair of metal yokes 20, one of which is rigidly connected to said pole 8 and loosely embraces the supplemental pole 19 and the other of which is rigidly connected to said supplemental pole 19 and loosely embraces the said main pole 8. Normally, the supplemental pole 19 is moved rearward so that it entirely overlies the main pole 8. The beam 21 of a two-horse equalizer is normally pivotally connected to the main pole 8 close to the rear end of the supplemental pole 19 by a pivot bolt 22 which is capable of being withdrawn vertically. Also, the equalizing beam 21 is connected to the rear end of the supplemental pole 19 preferably by a coupling ring 23 rigidly secured to said beam 21 with its forward portion working loosely in a keeper 24 secured to the rear end of said supplemental pole 19. The forwardly extended lower end of the cable 17 is directly secured to the rearwardly extended portion of this coupling ring 23. The ring 25 of an ordinary neck yoke 26 is normally engaged to the front end of the main pole 8 in the customary way, but this ring also normally embraces a forwardly projecting arm 27 rigidly secured to the front end of a supplemental pole 19. This arm 27 has a downturned hook 28 at its front end, with which the ring 25 of the neck yoke 26 will engage when drawn forward, as shown in Fig. 5.

The operation of the rack dumping mechanism above described is as follows: Normally, the parts stand in positions shown by full lines in Figs. 1, 2, 3 and 4, the equalizing beam 21 and the supplemental pole 19 being then locked to the main pole 8, by the pivot bolt 22. When the loaded rack is driven to the desired point for dumping the load, the pivot bolt 22 is withdrawn and the horses are then driven forward. When the horses are thus driven forward, the supplemental pole 19 will be drawn forward on the main pole 8 approximately to the position shown in Fig. 5, thereby positively raising the front end of the rack and tilting the latter into its dumping position. When the rack is moved into its dumping position, indicated by dotted lines in Fig. 2, its lower end will strike the ground, thereby preventing further forward movement of the supplemental pole 19 on the main pole 8, so that continued forward movement of the horses will draw the wagon and rack forward, thereby discharging the load from the rack and upon the ground at exactly the point desired. When the supplemental pole is moved forward, as above described, the ring 25 of the neck yoke 26, passes off from the main pole 8 onto the forwardly projecting arm 27 of the supplemental pole 19 and thus the neck yoke is caused to support the two-part pole while it is extended. After the load has been discharged from the rack, the horses are simply backed up until the supplemental pole 19 is moved to its normal position on the main pole 8, and the pivot bolt 22 is then replaced, thereby again connecting the equalizing beam 21 to the said main pole 8 and restoring all the parts to their normal positions. As already indicated, the rack will be restored to its normal position by gravity when the cable 17 is given slack by the rearward movement of the supplemental pole 19 in respect to the main pole 8.

The rack, the derrick mechanism and the so-called rack dumping device are so designed that they may be readily applied to any standard wagon running gear. The derrick frame is directly applied on the front bolster of the running gear and is steadied by the rear bolster. The front bolster affords a direct base of reaction for the derrick frame in the rack dumping action and, when the rack is in normal position, it is directly placed on to the front bolster by the forward portion of the said rack. The cable and its guide sheaves are so disposed that the pull on the cable is at all times approximately at a right angle to the base of the rack. When it is desired to use the running gear for some other purpose, the rack, the derrick frame and the supplemental pole may be very quickly and easily detached or removed and they may be again easily reapplied. Furthermore, the supplemental pole may, if desired, at all times be left on the main pole and the latter used in the ordinary way or as if said supplemental pole were not applied.

The fact that the wagon may be first driven and stopped at the place where it is desired to dump the load and then the load dumped precisely at the point desired, is highly important.

The entire mechanism, while of simple construction and comparatively small cost, is highly efficient for the purposes had in view.

What I claim is:

1. The combination with a wagon running gear and a rack mounted for dumping movements on the rear bolster thereof, of a derrick frame located in front of said rack with its upper portion extending above the normal position of the front end of said rack, and provided with a base portion resting on the front bolster of said running gear and normally pressed against said front bolster by the weight of the front end of said rack, said base having a rearwardly extended reach and a rack lifting connection between the front end of said rack and the upper portion of said derrick frame, substantially as described.

2. The combination with a wagon running gear and a rack mounted for dumping movements on the rear bolster of said running gear, of a derrick frame directly and detachably mounted on the front bolster of said running gear and provided with a reach extending rearward from its base and resting upon said rear bolster, the front end portion of said rack normally resting upon the base of said derrick frame, and a cable attached to the front end portion of said rack and passed over a suitable guide on the upper portion of said derrick frame, for imparting dumping movements to said rack.

3. The combination with a wagon running gear having front and rear bolsters and with stakes at the ends of said front bolster, of a rack mounted for dumping movements on said rear bolster, a derrick frame in front of said rack having a transversely extended base resting on said front bolster with its ends interlocked with the stakes thereof, and a rack lifting connection between the front end of said rack and said derrick frame, substantially as described.

4. The combination with a wagon running gear and a rack mounted for dumping movements thereon, of a derrick frame mounted on the front bolster of said running gear and provided with a reach projecting rearward from the base thereof and resting on the rear bolster of said running gear, a guide sheave on the upper portion of said derrick frame, a guide sheave on the front end portion of the reach thereof, and a cable attached to the front end portion of said rack and passed over the said two guide sheaves, for imparting dumping movements to said rack.

5. The combination with a wagon running gear having a front bolster provided with vertical stakes, of a derrick frame having a base portion resting on said front bolster and detachably held by said stakes, a rack mounted for dumping movements on the rear bolster of said running gear with its forward portion normally resting on the base of said derrick frame, and a connection between said derrick frame and the front portion of said rack, for tilting the latter into a dumping position, substantially as described.

In testimony whereof I affix my signature in presence of two witnesses.

JOHN B. BUSHNELL.

Witnesses:
F. D. MERCHANT,
HARRY D. KILGORE.